(12) United States Patent
Chung

(10) Patent No.: US 11,387,501 B2
(45) Date of Patent: Jul. 12, 2022

(54) SYSTEM AND METHOD OF MANAGING BATTERY FOR ECO-FRIENDLY VEHICLE

(71) Applicants: Hyundai Motor Company, Seoul (KR); Kia Motors Corporation, Seoul (KR)

(72) Inventor: Sung Jin Chung, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 130 days.

(21) Appl. No.: 16/684,433

(22) Filed: Nov. 14, 2019

(65) Prior Publication Data

US 2020/0335836 A1 Oct. 22, 2020

(30) Foreign Application Priority Data

Apr. 22, 2019 (KR) .......................... 10-2019-0046646

(51) Int. Cl.
*H01M 10/00* (2006.01)
*H01M 10/44* (2006.01)
(Continued)

(52) U.S. Cl.
CPC .......... *H01M 10/443* (2013.01); *B60L 58/14* (2019.02); *B60L 58/26* (2019.02); *B60L 58/27* (2019.02);
(Continued)

(58) Field of Classification Search
CPC ............... H01M 10/443; H01M 10/63; H01M 10/6568; H01M 10/625; H01M 2220/20;
(Continued)

(56) References Cited

U.S. PATENT DOCUMENTS 7,755,329 B2 * 7/2010 Kohn ................ H02J 7/007194
320/150
9,293,928 B2 * 3/2016 Alexander ........ H02J 13/00026
(Continued)

FOREIGN PATENT DOCUMENTS

CN 101151778 A * 3/2008 ............. H02J 7/342
KR 10-2017-0013700 A 2/2017

*Primary Examiner* — Naum Levin
(74) *Attorney, Agent, or Firm* — Morgan, Lewis & Bockius LLP

(57) ABSTRACT

A system for managing a battery for an eco-friendly vehicle may include: a main battery; an assistant battery; a main battery temperature management unit that is configured to maintain temperature of the main battery within a predetermined temperature range; an assistant battery charge unit that is configured to charge the assistant battery; a first measuring unit that is configured to measure a state of the assistant battery; a second measuring unit that is configured to measure a state of the main battery; and a that is configured to make controller that is configured to make the assistant battery be charged when the state of the assistant battery measured by the first measuring unit satisfies a predetermined charge condition, and that is configured to make the temperature of the main battery enter a predetermined temperature range when the temperature of the main battery measured by the second measuring unit is out of the predetermined temperature range.

12 Claims, 2 Drawing Sheets

(51) Int. Cl.
*H02K 9/19* (2006.01)
*H02J 7/00* (2006.01)
*B60L 58/27* (2019.01)
*B60L 58/14* (2019.01)
*H01M 10/63* (2014.01)
*H01M 10/6568* (2014.01)
*H01M 10/625* (2014.01)
*B60L 58/26* (2019.01)

(52) U.S. Cl.
CPC ......... *H01M 10/625* (2015.04); *H01M 10/63* (2015.04); *H01M 10/6568* (2015.04); *H02J 7/007* (2013.01); *H02J 7/0034* (2013.01); *H02K 9/19* (2013.01); *B60L 2240/545* (2013.01); *B60L 2240/547* (2013.01); *H01M 2220/20* (2013.01)

(58) Field of Classification Search
CPC .......... H02K 9/19; H02J 7/007; H02J 7/0034; B60L 58/27; B60L 58/14; B60L 58/26; B60L 2240/545; B60L 2240/547
See application file for complete search history.

(56) References Cited

U.S. PATENT DOCUMENTS

| | | | | |
|---|---|---|---|---|
| 9,515,357 | B2* | 12/2016 | Haskins | H01M 10/617 |
| 9,561,704 | B2* | 2/2017 | Enomoto | F01P 7/165 |
| 9,643,469 | B2* | 5/2017 | Kakehashi | B60H 1/04 |
| 9,748,614 | B2* | 8/2017 | Okawa | H01M 10/486 |
| 10,020,553 | B2* | 7/2018 | Hoshi | H01M 8/04141 |
| 10,126,027 | B2* | 11/2018 | Berg | H01M 10/663 |
| 10,333,328 | B1* | 6/2019 | Hom | H02J 7/008 |
| 10,497,996 | B1* | 12/2019 | Muniz | H01M 50/20 |
| 2011/0144861 | A1* | 6/2011 | Lakirovich | B60L 50/64 |
| | | | | 701/36 |
| 2011/0209949 | A1* | 9/2011 | McCabe | B66F 9/24 |
| | | | | 187/222 |
| 2013/0307480 | A1* | 11/2013 | Boggs | B60L 58/15 |
| | | | | 320/118 |
| 2014/0038009 | A1* | 2/2014 | Okawa | H02J 7/007192 |
| | | | | 429/62 |
| 2014/0091748 | A1* | 4/2014 | Hermann | B60L 58/15 |
| | | | | 320/103 |
| 2018/0222286 | A1* | 8/2018 | Blatchley | H01M 10/6567 |
| 2020/0072178 | A1* | 3/2020 | Berkson | B60R 16/03 |

* cited by examiner

SYSTEM AND METHOD OF MANAGING BATTERY FOR ECO-FRIENDLY VEHICLE

CROSS-REFERENCE TO RELATED APPLICATION

The present application claims priority to Korean Patent Application No. 10-2019-0046646, filed on Apr. 22, 2019, the entire contents of which is incorporated herein for all purposes by this reference.

BACKGROUND OF THE INVENTION

Field of the Invention

The present invention relates to a system and method of managing a battery for an eco-friendly vehicle and, more particularly, to a system and method of managing a battery for an eco-friendly vehicle, the system and method reducing the problem with an output drop of a battery at low temperature.

Description of Related Art

Recently, as the interest in energy efficiency and the problem with environment contamination is increasing, it is required to develop an eco-friendly vehicle that can substantially replace the vehicle with an internal combustion engine. Such an eco-friendly vehicle is discriminated from an electric vehicle usually employing a fuel cell or electricity as power source for driving and a hybrid vehicle employing an engine and a battery for driving.

In detail, an electric vehicle and a hybrid vehicle are provided with a battery for supplying electricity. The battery, which is chargeable, supplies energy for driving a vehicle by providing electricity to an electric motor, various electric devices, etc. mounted in the vehicle.

High-voltage batteries that are mounted in vehicles are largely influenced by temperature in charging. In detail, when the temperature of a high-voltage battery decreases under low temperature such as in wintertime, the charge efficiency of a battery and the charge time is also increased, so there is a problem that it is difficult to secure output that drivers want. Therefore, it is required to develop a technology that manages a battery to be configured to secure output that a driver desires even at low temperature.

The information included in this Background of the present invention section is only for enhancement of understanding of the general background of the present invention and may not be taken as an acknowledgement or any form of suggestion that this information forms the related art already known to a person skilled in the art.

BRIEF SUMMARY

Various aspects of the present invention are directed to providing a system and method of managing a battery for an eco-friendly vehicle, the system and method managing a battery of a vehicle such that an assistant battery is managed not to be discharged and output that a driver desires may be secured even at low temperature.

In view of an aspect, a system for managing a battery for an eco-friendly vehicle according to an exemplary embodiment of the present invention may include: a main battery; an assistant battery; a main battery temperature management unit that is configured to maintain temperature of the main battery within a predetermined temperature range; an assistant battery charge unit that is configured to charge the assistant battery; a first measuring unit that is configured to measure a state of the assistant battery; a second measuring unit that is configured to measure a state of the main battery; and a that is configured to make controller that is configured to make the assistant battery be charged when the state of the assistant battery measured by the first measuring unit satisfies a predetermined charge condition, and that is configured to make the temperature of the main battery enter a predetermined temperature range when the temperature of the main battery measured by the second measuring unit is out of the predetermined temperature range.

The controller may include: an assistant battery management unit that compares a state of the assistant battery measured by the first measuring unit with a predetermined value, and charges the assistant battery through the assistant battery charge unit when the state is a predetermined value or less; and a main battery management unit that compares the temperature of the main battery measured by the second measuring unit with a predetermined range, and makes the temperature of the main battery enter the predetermined temperature range through the main battery temperature management unit when the temperature is out of the predetermined temperature range.

The main battery management unit may heat the main battery when the measured temperature of the main battery is equal to or less than the predetermined temperature.

The controller may wake up the second measuring unit to measure the state of the main battery before the assistant battery management unit charges the assistant battery.

The state of the assistant battery may include one or more of voltage and a State of charge (SOC) value of the assistant battery, and the state of the main battery may include one or more of temperature a State of Charge (SOC), and discharge output of the main battery.

The system may further include an electric device cooler that cools electric devices of an eco-friendly vehicle; and a connector that connects the electric device cooler and the main battery temperature management unit to each other.

The electric devices of an eco-friendly vehicle may include an inverter and a motor.

The electric device cooler may include: the electric devices of an eco-friendly vehicle; a heat exchanger that cools cooling water flowing into the electric device cooler; a first pump that circulates cooling water in the electric device cooler; a reservoir tank which is injected with and stores cooling water; and an electric device cooling pipe that connects the heat exchanger, the first pump, and the reservoir tank, and through which cooling water flows.

The main battery temperature management unit may include: a second pump that supplies cooling water injected in a reservoir tank to the main battery temperature management unit; a main battery pipe that connects the second pump and the main battery to each other, and through which the cooling water flows; a cooling water heater that heats the cooling water in the main battery pipe; and a chiller that cools the cooling water in the main battery pipe.

In view of another aspect, a method of managing a battery for an eco-friendly vehicle according to an exemplary embodiment of the present invention may include: measuring a state of an assistant battery; charging the assistant battery for a predetermined time when the measured state satisfies a predetermined charge condition; measuring a state of a main battery; determining whether the measured result is out of a predetermined temperature range; and controlling the main battery to enter the predetermined temperature range when the measured result is out of the predetermined temperature range.

According to the system for managing a battery for an eco-friendly vehicle of the present invention, the controller makes the assistant battery be charged when the state of the assistant battery measured by the first measuring unit satisfies a predetermined charge condition, being able to prevent the assistant battery from being discharged. Furthermore, the controller makes the temperature of the main battery enter a predetermined temperature range through the main battery temperature management unit when the temperature of the main battery measured by the second measuring unit deviates from the predetermined temperature range, being able to maintain the efficiency of the main battery in an optimal state. Therefore, it is possible to easily secure output that a driver desires even at low temperature such as in wintertime.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
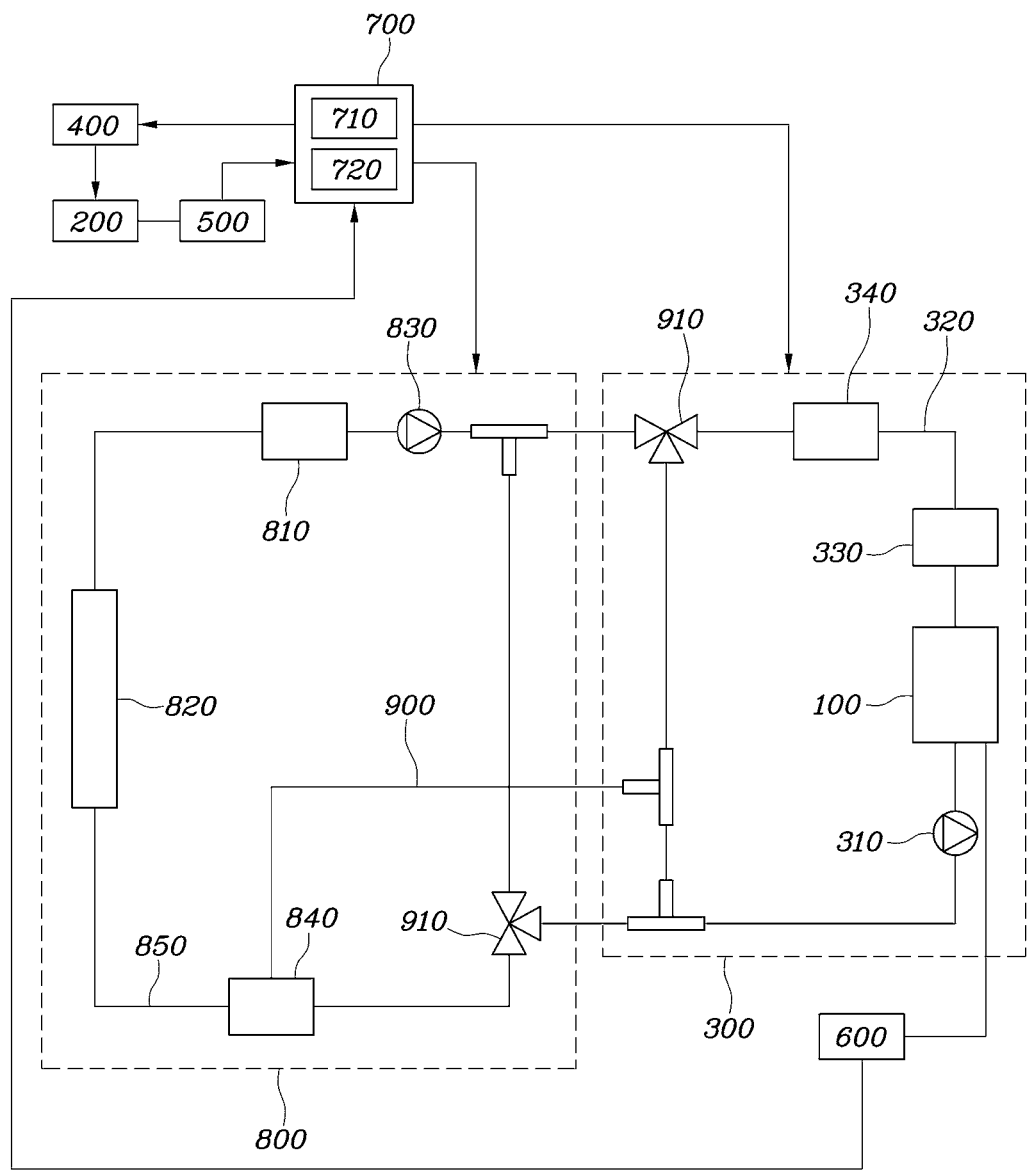
FIG. 1 is a diagram schematically showing the entire configuration of a system for managing a battery for an eco-friendly vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A system and method for managing a battery for an eco-friendly vehicle according to exemplary embodiments of the present invention will be described herein with reference to the accompanying drawings.

FIG. 1 is a diagram schematically showing the entire configuration of a system for managing a battery for an eco-friendly vehicle according to an exemplary embodiment of the present invention. As shown in FIG. 1, a system for managing a battery for an eco-friendly vehicle according to an exemplary embodiment of the present invention may include a main battery 100, an assistant battery 200, a main battery temperature management unit 300, an assistant battery charge unit 400, a first measuring unit 500, a second measuring unit 600, and a controller 700. The system and method for managing a battery for an eco-friendly vehicle according to an exemplary embodiment of the present invention may be applied to a hybrid vehicle using both an engine and a motor, or an electric vehicle and a fuel cell vehicle, etc.

In detail, the main battery 100, if necessary, provides energy for driving an eco-friendly vehicle and keeps electrical energy which is generated by a recovery power source when a vehicle is decelerated or stopped. The main battery 100 in an exemplary embodiment of the present invention may be a high-voltage battery that can provide energy required for driving an eco-friendly vehicle by driving a motor mounted in the vehicle. Furthermore, the assistant battery 200 supplies power to several electric devices mounted in a vehicle.

The main battery temperature management unit 300 maintains the temperature of the main battery within a predetermined temperature range. The main battery 100 is sensitive to temperature due to the chemical characteristic of a battery cell, so that the charge amount and discharge amount are increased, depending on temperature, whereby the efficiency of the battery may be increased. In detail, the higher the temperature, the more the charge amount and discharge amount increase within a predetermined temperature range, so that the efficiency of a battery increases. However, when the temperature of the main battery 100 exceeds a predetermined temperature or is lower than the predetermined temperature, the charge amount and discharge amount of the main battery rapidly decrease, so there is a problem that the efficiency of the battery rapidly decreases and output that a driver desires cannot be secured. In an exemplary embodiment of the present invention, the main battery temperature management unit 300 maintains the temperature of the main battery 100 within the predetermined temperature range, being able to maintain the main battery 100 in an optimal state.

In detail, the main battery temperature management unit 300 may include a second pump 310, a main battery pipe 320, a cooling water heater 330, and a chiller 340.

The second pump 310 supplies cooling water injected in a reservoir tank 840 to the main battery temperature management unit 300. The second pump 310 may be an Electric Water Pump (EWP) in an exemplary embodiment of the present invention. In more detail, the second pump 310 circulates cooling water, which has been cooled through the chiller 340, through the main battery pipe 320, whereby the main battery 100 is cooled. Accordingly, overheating of the main battery 100 may be prevented. Furthermore, the second pump 310 circulates cooling water, which has been heated through the cooling water heater 330, through the main battery pipe 320, whereby the main battery 100 is heated. Accordingly, it is possible to prevent the temperature of the main battery 100 from dropping to a predetermined temperature or less.

The main battery pipe 320 connects the second pump 310, the main battery 100, the cooling water heater 330, and the chiller 340, and the cooling water in the main battery pipe 320 can flow and circulate by the second pump 310.

The cooling water heater 330 heats the cooling water in the main battery pipe 320. The cooling water heater 330 may be controlled by a main battery management unit 720, which will be described below, to heat the cooling water in the main battery pipe 320 when the temperature of the main battery 100 becomes a predetermined temperature or less, whereby the temperature of the main battery 100 can enter a predetermined temperature range.

The chiller 340 cools the cooling water in the main battery pipe 320. In detail, the chiller 340, though not shown in detail in the drawings, may be maintained at low temperature by a refrigerant circulating a refrigerant pipe of an air conditioner in a vehicle, can cool cooling water by exchanging heat with the cooling water circulating through the main battery pipe 320, and can cool the main battery 100 using cooled cooling water.

The assistant battery charge unit 400 charges the assistant battery 200. The assistant battery charge unit 400 is controlled by an assistant battery management unit 710 to be described below, being able to charge the assistant battery 200 when the state of the assistant battery 200 measured by the first measuring unit 500 satisfies a predetermined charge condition. Depending on embodiments, the assistant battery charge unit 400 can charge the assistant battery 200 using output power of the main battery 100 or power which is supplied from an external power source.

The first measuring unit 500 measures the state of the assistant battery 200. Depending on embodiments, the first measuring unit 500 may always measure the state of the assistant battery 200 or may measure the state of the assistant battery 200 at every predetermined period. The state of the assistant battery 200 may include one or more of the voltage and the State of charge (SOC) value of the assistant battery 200. Depending on embodiments, the first measuring unit 500 may be an Intelligent Battery System (IBS) that can detect the voltage and charge state of the assistant battery 200. However, this is only an exemplary embodiment and other various sensors may be used as the first measuring unit 500 as long as they can measure the state of the assistant battery.

The second measuring unit 600 measures the state of the main battery 100. Depending on embodiments, the second measuring unit 600 may always measure the state of the main battery 100 or may measure the state of the main battery 100 at every predetermined period. The state of the main battery 100 may include one or more of the temperature, charge state, and discharge output of the main battery 100. Depending on embodiments, the second measuring unit 600 may be an Intelligent Battery System (IBS) that can detect the temperature, charge state, and discharge output of the main battery 100. However, this is only an exemplary embodiment and other various sensors may be used as the second measuring unit 600 as long as they can measure the state of the main battery.

The controller 700 makes the assistant battery 200 be charged when the state of the assistant battery 200 measured by the first measuring unit 500 satisfies a predetermined charge condition, and makes the temperature of the main battery 100 enter a predetermined temperature range when the temperature of the main battery 100 measured by the second measuring unit 600 deviates from the predetermined temperature range.

In detail, the controller 700 may include the assistant battery management unit 710 and the main battery management unit 720.

The assistant battery management unit 710 receives input about the state of the assistant battery 200 measured by the first measuring unit 500, compares the measured state information related to the assistant battery 200 with a predetermined value, and then can charge the assistant battery 200 through the assistant battery charge unit 400 when the state information is the predetermined value or less. Depending on embodiments, the assistant battery management unit 710 can charge the assistant battery 200 through the assistant battery charge unit 400 when the SOC value of the assistant battery 200 measured by the first measuring unit 500 is smaller than a predetermined value.

The main battery management unit 720 compares the temperature of the main battery 100 measured by the second measuring unit 600 with a predetermined range, and can make the temperature of the main battery 100 enter the predetermined temperature range through the main battery temperature management unit 300 when the temperature is out of the predetermined temperature range. For example, when the temperature of the main battery 100 measured by the second measuring unit 600 is a predetermined temperature or less, the main battery management unit 720 can increase the temperature of the main battery 100 by operating the cooling water heater 330 such that the cooling water in the main battery pipe 320 is heated. Furthermore, when the temperature of the main battery 100 measured by the second measuring unit 600 is a predetermined temperature or higher, the main battery management unit 720 can decrease the temperature of the main battery 100 by operating the chiller 340 such that the cooling water in the main battery pipe 320 is cooled.

Meanwhile the controller 700 can wake up the second measuring unit 600 to measure the state of the main battery 100 before the assistant battery management unit 710 charges the assistant battery 200. Depending on embodiments, the controller 700 can wake up the second measuring unit 600 to measure the state of the main battery 100 at 30~60 seconds before the assistant battery management unit 710 charges the assistant battery 200.

On the other hand, the system for managing a battery for an eco-friendly vehicle according to an exemplary embodiment of the present invention may further include an electric device cooler 800 for cooling the electric devices of an eco-friendly vehicle and a connector 900 connecting the electric device cooler 800 and the main battery temperature management unit 300 to each other. The electric device cooler 800 may be controlled by the controller 700 described above.

In detail, the electric device cooler 800 may include an electric device 810 of an eco-friendly vehicle, a heat exchanger 820 that cools cooling water flowing into the electric device cooler 800, a first pump 830 that circulates cooling water in the electric device cooler 800, a reservoir tank 840 which is injected with and stores cooling water, and an electric device cooling pipe 850 that connects the heat exchanger 820, the first pump 830, and the reservoir tank 830, and through which cooling water flows. The electric device cooling pipe 850 and the main battery pipe 320 may be connected to each other through a plurality of three-way valves 910 etc.

In detail, the electric device 810 of an eco-friendly vehicle, which is an electric device that generates heat when an eco-friendly vehicle is driven, may include a motor and an inverter that are required for driving an eco-friendly vehicle, depending on embodiments. Furthermore, various electric devices that are required to be cooled because they generate heat when an eco-friendly vehicle is driven may be included in the electric device of the present invention. For example, the electric device 810 may include a Hybrid Starter Generator (HSG), a Hybrid Power Control Unit (HPCU), an Oil Pump Unit (OPU), etc.

The heat exchanger 820 may be mounted in the front of a vehicle and cools cooling water that flows through the cooling pipe 850 of the electric device cooler. Depending on embodiments, the heat exchanger 820 may be a radiator. In detail, the heat exchanger 820 can cool the cooling water that flows through the electric device cooling pipe 850 through heat exchange with external air that flows inside when a vehicle is driven.

The first pump 830 circulates cooling water in the electric device cooler 800. The first pump 130 may be an Electric Water Pump (EWP) in an exemplary embodiment of the present invention. In more detail, the first pump 830 circulates cooling water, which has been cooled through the heat exchanger 820, through the electric device cooling pipe 850, being able to cool the electric device 810 including a motor and an inverter such that they are not overheated.

The reservoir tank 840 is injected with cooling water and keeps the cooling water, and the injected cooling water may be supplied to the main battery temperature management unit 300 through the connector 900. The cooling water injected in the reservoir tank 840 may be supplied to the main battery pipe 320 after a vacuum state is generated in the main battery pipe 320. Alternatively, the cooling water injected in the reservoir tank 840 may be forcibly supplied to the main battery pipe 320 by driving the second pump 310.

The electric device cooling pipe 850 connects the heat exchanger 820, the first pump 830, and the reservoir tank 840, whereby the cooling water in the electric device cooling pipe 850 can flow and circulate through the first pump 830.

According to the system for managing a battery for an eco-friendly vehicle of the present invention including the detailed configuration described above, the controller makes the assistant battery be charged when the state of the assistant battery measured by the first measuring unit satisfies a predetermined charge condition, being able to prevent the assistant battery from being discharged. Furthermore, the controller makes the temperature of the main battery enter a predetermined temperature range through the main battery temperature management unit when the temperature of the main battery measured by the second measuring unit deviates from the predetermined temperature range, being able to maintain the efficiency of the main battery in an optimal state. Therefore, it is possible to easily secure output that a driver desires even at low temperature such as in wintertime.

Figure 2:
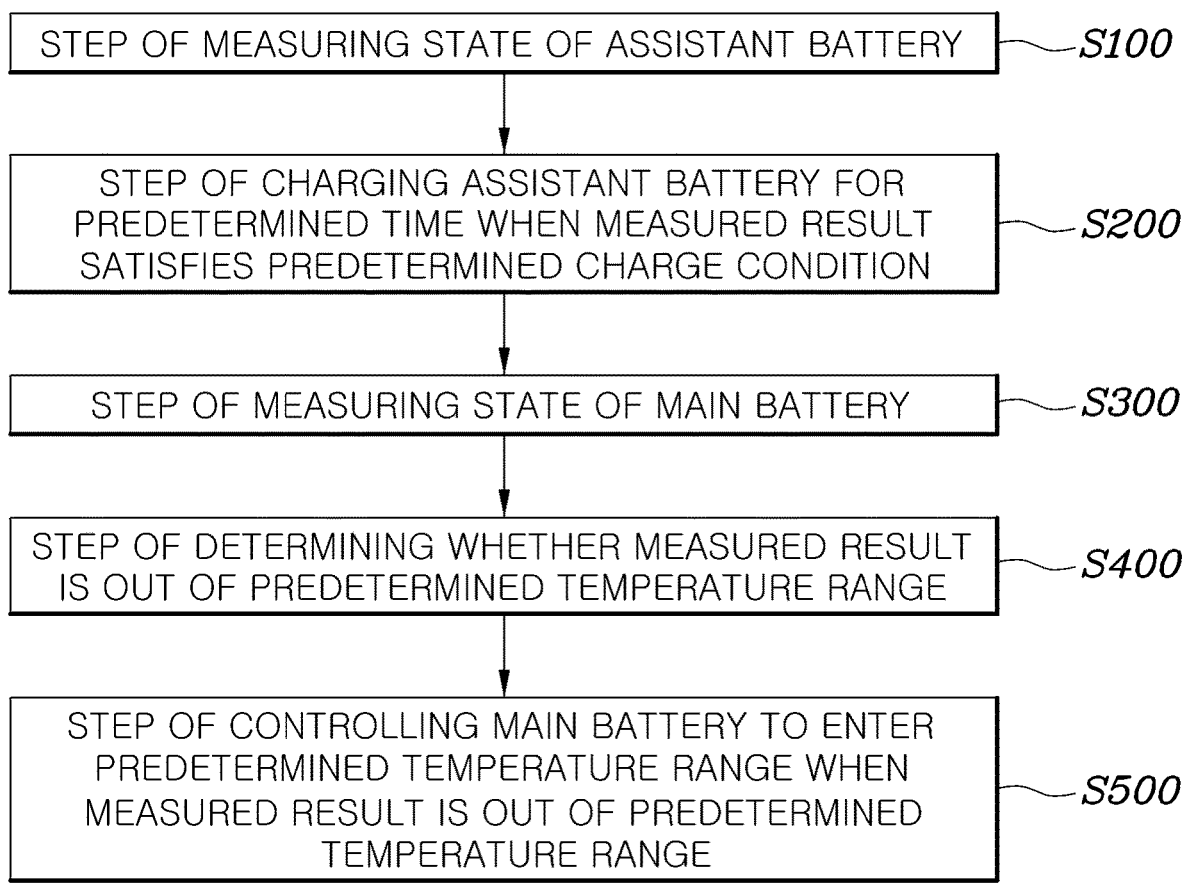
FIG. 2 is a flowchart schematically showing a method of managing a battery for an eco-friendly vehicle according to an exemplary embodiment of the present invention.

FIG. 2 is a flowchart schematically showing a method of managing a battery for an eco-friendly vehicle according to an exemplary embodiment of the present invention. As shown in FIG. 2, the method may include: measuring the state of an assistant battery S100; charging the assistant battery for a predetermined time when the measured state satisfies a predetermined charge condition S200; measuring the state of a main battery S300; determining whether the measured result is out of a predetermined temperature range S400; and controlling the main battery to enter the predetermined temperature range when the measured result is out of the predetermined temperature range S500. The technological characteristics in the detailed steps of the method of managing a battery for an eco-friendly vehicle according to an exemplary embodiment of the present invention are the same as those in the system for managing a battery for an eco-friendly vehicle described above, so that the detailed description thereof are not provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system of managing battery for a vehicle, the system comprising:
   a first battery;
   a second battery;
   a first battery temperature management unit that is configured to maintain a temperature of the first battery within a predetermined temperature range;
   a battery charge unit that is configured to charge the second battery;
   a first measuring unit that is configured to measure a state of the second battery;
   a second measuring unit that is configured to measure a state of the first battery; and
   a controller that is configured to make the second battery be charged upon determining that the state of the second battery measured by the first measuring unit satisfies a predetermined charge condition, and that is configured to make a temperature of the first battery enter a first predetermined temperature range upon determining that the temperature of the first battery measured by the second measuring unit is out of the first predetermined temperature range,
   wherein the controller includes a first battery management unit that compares the state of the second battery measured by the first measuring unit with a predetermined value, and charges the second battery through the battery charge unit when the state of the second battery is equal to or less than the predetermined value, and
   wherein the controller is configured to wake up the second measuring unit to measure the state of the first battery before the first battery management unit of the controller controls the battery charge unit that in turn charges the second battery.

2. The system of claim 1, wherein the controller includes:
   a second battery management unit that compares the temperature of the first battery measured by the second measuring unit with a second predetermined temperature range, and makes the temperature of the first battery enter the second predetermined temperature range through the first battery temperature management unit when the temperature of the first battery is out of the second predetermined temperature range.

3. The system of claim 2, wherein the second battery management unit is configured to heat the first battery upon determining the measured temperature of the first battery is equal to or less than the second predetermined temperature range.

4. The system of claim 1,
wherein the state of the second battery includes at least one of voltage and a State of charge (SOC) value of the second battery, and
wherein the state of the first battery includes at least one of temperature, a State of Charge (SOC), and discharge output of the first battery.

5. The system of claim 1, further including:
an electric device cooler that cools electric devices of the vehicle; and
a connector that connects the electric device cooler and the first battery temperature management unit to each other.

6. The system of claim 5, wherein the electric devices include an inverter and a motor.

7. The system of claim 5, wherein the electric device cooler includes:
the electric devices;
a heat exchanger that cools cooling water flowing into the electric device cooler;
a first pump that circulates cooling water in the electric device cooler;
a reservoir tank which is injected with and stores cooling water; and
an electric device cooling pipe that connects the heat exchanger, the first pump, and the reservoir tank, and through which the cooling water flows.

8. The system of claim 7, wherein the first battery temperature management unit includes:
a second pump that supplies the cooling water injected in the reservoir tank to the first battery temperature management unit;
a first battery pipe that connects the second pump and the first battery to each other, and through which the cooling water flows;
a cooling water heater that heats the cooling water in the first battery pipe; and
a chiller that cools the cooling water in the first battery pipe.

9. A method of managing a battery for a vehicle, the method comprising:
measuring a state of a second battery;
charging the second battery for a predetermined time when the measured state of the second battery satisfies a predetermined charge condition;
measuring, by a second measuring unit, a state of a first battery;
determining, by a controller, when the measured state of the first battery is out of a predetermined temperature range; and
controlling, by the controller, the first battery to enter the predetermined temperature range upon determining that the measured state of the first battery is out of the predetermined temperature range,
wherein the controller includes a battery management unit that compares the state of the second battery measured by a first measuring unit with a predetermined value, and charges the second battery through a battery charge unit when the state of the second battery is equal to or less than the predetermined value, and
wherein the controller is configured to wake up the second measuring unit to measure the state of the first battery before the battery management unit of the controller controls the battery charge unit that in turn charges the second battery.

10. The method of claim 9, further including:
comparing a temperature of the first battery with the predetermined temperature range, and making the temperature of the first battery enter the predetermined temperature range when the temperature of the first battery is out of the predetermined temperature range.

11. The method of claim 9,
wherein the state of the second battery includes at least one of voltage and a State of charge (SOC) value of the second battery.

12. The method of claim 9,
wherein the state of the first battery includes at least one of temperature, a State of Charge (SOC), and discharge output of the first battery.

* * * * *